(12) United States Patent
Lees et al.

(10) Patent No.: US 11,940,332 B2
(45) Date of Patent: Mar. 26, 2024

(54) WET BULB TEMPERATURE SENSOR SYSTEM AND METHOD FOR DIRECT MEASUREMENT OF WET BULB TEMPERATURE IN AN OVEN

(71) Applicant: Anova Applied Electronics, Inc., San Francisco, CA (US)

(72) Inventors: Harrison John Lees, San Francisco, CA (US); Scott Martin Heimendinger, San Francisco, CA (US); Carl Håkan Messler, San Francisco, CA (US)

(73) Assignee: Anova Applied Electronics, Inc., San Francisco, CA (US)

( * ) Notice: Subject to any disclaimer, the term of this patent is extended or adjusted under 35 U.S.C. 154(b) by 423 days.

(21) Appl. No.: 17/029,809

(22) Filed: Sep. 23, 2020

(65) Prior Publication Data

US 2021/0088388 A1    Mar. 25, 2021

Related U.S. Application Data

(60) Provisional application No. 62/904,232, filed on Sep. 23, 2019.

(51) Int. Cl.
  *G01K 13/00*   (2021.01)
  *A21B 1/40*    (2006.01)
  *G01N 25/62*   (2006.01)

(52) U.S. Cl.
  CPC ............... *G01K 13/00* (2013.01); *A21B 1/40* (2013.01); *G01N 25/62* (2013.01)

(58) Field of Classification Search
  CPC .............................. G01K 13/00; G01N 25/62

USPC ........................................................ 374/141
See application file for complete search history.

(56) References Cited

U.S. PATENT DOCUMENTS

| 4,770,888 | A | * | 9/1988 | Loeb .................... F24C 15/327 |
| | | | | 426/523 |
| 4,924,072 | A | | 5/1990 | Oslin |
| 5,077,065 | A | | 12/1991 | Ash et al. |
| 6,157,006 | A | | 12/2000 | Sickles et al. |
| | | | | (Continued) |

FOREIGN PATENT DOCUMENTS

| CN | 108061160 A | * | 5/2018 | |
| DE | 10335295 A1 | * | 3/2005 | ............... A21B 3/04 |
| | (Continued) | | | |

OTHER PUBLICATIONS

Alkar Technical Reports—The Real Truth About Cooking, downloaded at www.h2oop.com/wp-content/uploads/2014/12/Alkar-Technical-Reports- The Real Truth About Cooking.htm, 2014, 3 pages.

(Continued)

*Primary Examiner* — Natalie Huls
*Assistant Examiner* — Cynthia L Davis
(74) *Attorney, Agent, or Firm* — Pearne & Gordon LLP

(57) ABSTRACT

A cooking oven wet bulb sensor system having: a reservoir configured to be secured to a cooking chamber wall of the cooking oven, with a cavity of the reservoir in an upward-facing orientation; a temperature sensor probe configured to be mounted at least partially within the cavity of the reservoir; and a water fill opening positioned to dispense water into the cavity. A cooking oven having a wet bulb sensor system and a method for operating a cooking oven are also provided.

21 Claims, 3 Drawing Sheets

(56) References Cited

U.S. PATENT DOCUMENTS

| | | |
|---|---|---|
| 6,521,871 B1 | 2/2003 | Shelton |
| 7,612,315 B2 | 11/2009 | Corradini |
| 8,207,477 B2 | 6/2012 | Embury et al. |
| 8,993,934 B2 | 3/2015 | Giazzon et al. |
| 9,016,285 B2 | 4/2015 | Riddick |
| 9,060,523 B1 | 6/2015 | Buller-Colthurst |
| 2006/0289507 A1 | 12/2006 | Corradini |
| 2007/0092616 A1 | 4/2007 | Witte et al. |
| 2008/0202350 A1 | 8/2008 | Maki |
| 2009/0133684 A1 | 5/2009 | Embury et al. |
| 2009/0250452 A1 | 10/2009 | Tse |
| 2013/0306083 A1 | 11/2013 | Riddick |
| 2017/0049257 A1 | 2/2017 | Shelton et al. |
| 2017/0188613 A1 | 7/2017 | Rosales et al. |
| 2017/0351278 A1 | 12/2017 | Raghavan et al. |
| 2018/0213801 A1 | 8/2018 | Morey et al. |
| 2018/0213963 A1 | 8/2018 | Morey et al. |

FOREIGN PATENT DOCUMENTS

| | | | |
|---|---|---|---|
| DE | 10335295 B4 | 2/2008 | |
| EP | 0701388 A2 | 3/1996 | |
| EP | 1477091 A1 | 11/2004 | |
| EP | 2390587 A2 | 11/2011 | |
| EP | 2746682 A2 | 6/2014 | |
| JP | 2005110941 A | 4/2005 | |
| KR | 20070054993 A * | 5/2007 | ............... G01K 7/22 |
| WO | 1986004206 A1 | 7/1986 | |
| WO | 2005111509 A1 | 11/2005 | |

OTHER PUBLICATIONS

Grande, "White Paper: Using Humidity Control in Heat Processing", 2014, downloaded from www.infratrol.com/news/2014-07-08_White-Paper-Humidity-Control-Systems.html, 2 pages.

Why is Humidity Important in Cooking, 2019, downloaded at https://www.scienceofcooking.com/why_is_humidity_important_in_cooking.htm, 2 pages.

International Search Report and Written Opinion for International Application No. PCT/US2020/052209, dated Feb. 3, 2021, 13 pages.

International Preliminary Report on Patentability for International Application No. PCT/EP2020/052209, dated Mar. 15, 2022, 9 pages.

International Preliminary Report on Patentability and Written Opinion for International Application No. PCT/US2021/050587, dated Mar. 28, 2023, 11 pages.

International Search Report and Written Opinion for International Application No. PCT/US2021/050587, dated Mar. 24, 2022, 14 pages.

* cited by examiner

WET BULB TEMPERATURE SENSOR SYSTEM AND METHOD FOR DIRECT MEASUREMENT OF WET BULB TEMPERATURE IN AN OVEN

BACKGROUND

Culinary ovens have historically allowed the user to set a cooking temperature that the oven's internal thermostat moderates. The oven maintains a stable cooking temperature, within a margin of error, and cooking processes can proceed with predictable timing and results: your chicken roasts at 375° F. for an hour and is reliably cooked.

However, both professional and home cooks have grown in their sophistication and in the level of expected precision in their cooking appliances. This increase in sophistication is owed, in part, to the introduction of sous vide cooking (cooking in a heated liquid bath) to mainstream consumers over the past 10 years. While the actual measured temperature of the air in a traditional oven might fluctuate 20° F. above and below the user's target temperature, consumer sous vide devices can maintain a cooking temperature within a tolerance of around 0.2° F.

This dramatic increase in the precision of cooking temperature allows for much greater control of food doneness. For instance, the temperature difference between a rare and medium-rare steak is less than 10° F.—smaller than the margin of error in most conventional ovens. The texture of whole eggs or egg-based dishes is even more sensitive to temperature.

In addition to precise temperature control, the sous vide cooking method prevents foods from drying out, even during long cooking or holding times. In sous vide, the food is sealed in a pouch—commonly a vacuum-sealed plastic bag, but alternatively in sealed silicone bags, or jars. The sealed environment means that the water content of the food has nowhere to escape during the cooking process.

However, the sous vide method has limitations. For example, foods must be sealed to avoid becoming waterlogged in the cooking bath, so some dishes fundamentally aren't suited to sous vide cooking. A whole chicken, for example, is hard to fit into a bag, and leaves a void in the middle of its cavity that will slow down the cooking process. Also, because foods are sealed, cooking operations that specifically require evaporation are unachievable in the sous vide method. This includes almost all baking, roasting, and frying. And, because the sous vide method heats the food via a temperature controlled water bath, the cooking environment can never exceed 100° C./212° F.—the boiling point of water. This low temperature limit means that all sous vide cooking takes place at temperatures well below the threshold for browning reactions.

To overcome these limitations, some modern ovens include steam generators to allow cooking to occur over a range of humidity levels in addition to temperatures. Such steam generators affect the relative humidity of the air in the oven. The relative humidity is a measure of the amount of water content in a volume of air as a percentage of the total theoretical water content that the air is capable of holding. As the temperature of air increases, the total water content it can hold increases dramatically. This is why summer weather feels more humid, on balance, than winter weather. Relative humidity can be measured or calculated in various ways.

A typical method for determining relative humidity in the setting of general scientific experimentation is based on evaluating the "dry bulb" temperature and "wet bulb" temperature of the air. The dry bulb temperature is the temperature measured by a thermometer in air—it is the temperature reading we are most familiar with in daily life. In a traditional oven, a thermostat (e.g., a calibrated thermocouple) measures the dry bulb temperature of the air, and uses this as the basis for setting and controlling the cooking temperature. The wet bulb temperature is the dry bulb temperature minus the effects of evaporative cooling. A traditional method of measuring wet bulb temperature is to drape the sensing end of a thermometer with a piece of water-soaked cotton cloth. As the water in the cloth evaporates into the surrounding air, the energy required to convert liquid water to steam is carried away in the latent heat of vaporization. As a result, the evaporation cools the cloth and thermometer. This is the same phenomenon whereby evaporating sweat cools the human body. The wet bulb temperature is always less than or equal to the dry bulb temperature, and is always less than or equal to the boiling point of water.

The relative humidity can be calculated based on the dry bulb temperature, wet bulb temperature and atmospheric pressure using the following formulas:

$$V_s = 6.112 \times e^{\left(\frac{17.67 \times T_d}{243.5 + T_d}\right)} \qquad \text{Equation 1}$$

$$V_a = 6.112 \times e^{\left(\frac{17.67 \times T_w}{243.5 + w}\right)} - P \times (T_d - T_w) \times 0.00066 \times (1 + (0.00115 \times T_w)) \qquad \text{Equation 2}$$

$$RH = \frac{V_a}{V_s} \times 100\% \qquad \text{Equation 3}$$

Where: $V_s$ is the saturation vapor density, $V_a$ is the actual vapor density, $T_d$ is the dry bulb temperature, $T_w$ is the wet bulb temperature, P is the atmospheric pressure in millibar, and RH is the relative humidity.

As a consequence of this mathematical derivation, the set of theoretically possible wet bulb and relative humidity values becomes limited as the dry bulb temperature of air increases above the boiling point of water. This is illustrated in FIG. 1, which is a chart of theoretically achievable wet bulb temperatures across a dry bulb range of 30° C. to 250° C. at sea level, and FIG. 2, which is a chart of theoretically achievable relative humidity values across a dry bulb range of 30° C. to 250° C. at sea level.

As demonstrated in these figures and formulas, there is a direct relationship between wet bulb temperature and relative humidity. Both of these variables play a critical role in cooking almost all foods, yet their roles have been largely ignored by traditional ovens and cooking techniques.

Most foods contain a large amount of water as a proportion of their total mass. As shown in Table 1, which is the USDA National Nutrient Database for Standard Reference (Release 21), meats and vegetables used in cooking commonly comprise more than 50 percent water. The way these foods behave when cooked is governed by the behavior of their water content.

TABLE 1

| WATER % | FOOD ITEM |
| --- | --- |
| 100% | Water |
| 90-99% | Fat-free milk, cantaloupe, strawberries, watermelon, lettuce, cabbage, celery, spinach, pickles, squash (cooked) |
| 80-89% | Fruit juice, yogurt, apples, grapes, oranges, carrots, broccoli (cooked), pears, pineapple |

TABLE 1-continued

| WATER % | FOOD ITEM |
|---|---|
| 70-79% | Bananas, avocados, cottage cheese, ricotta cheese, potato (baked), corn (cooked), shrimp |
| 60-69% | Pasta, legumes, salmon, ice cream, chicken breast |
| 50-59% | Ground beef, hot dogs, feta cheese, tenderloin steak (cooked) |
| 40-49% | Pizza |
| 30-39% | Cheddar cheese, bagels, bread |
| 20-29% | Pepperoni sausage, cake, biscuits |
| 10-19% | Butter, margarine, raisins |
| 1-9% | Walnuts, peanuts (dry roasted), chocolate chip cookies, crackers, cereals, pretzels, taco shells, peanut butter |
| 0% | Oils, sugars |

As long as water is present in food, that part of the food cannot exceed the boiling point temperature of water, regardless of the temperature of the cooking environment. For instance, the surface temperature of a steak cooking in a 250° C. oven will never exceed 100° C. until all of the water content has been evaporated away from the surface. Only then, once the surface is dry, will the food reach higher temperatures, in particular, those temperatures required for Maillard reactions and browning. Put another way, the temperature that a wet food "experiences" is always the wet bulb temperature.

In an environment of 100% relative humidity, the dry bulb and wet bulb temperatures are identical. Inside a sous vide bag, the moisture in the food cannot escape the sealed environment of the bag and the relative humidity quickly rises to 100%. However, one can achieve a similar environment by generating steam in an oven. This means that one can cook "sous vide style," but in an oven, by using steam generation to bring the wet bulb and dry bulb temperatures into alignment. But to use this method to its fullest potential, one must implement some method of measuring or inferring wet bulb temperature.

There are several known methods for measuring wet bulb temperature directly, or inferring the wet bulb temperature from a given combination of relative humidity and dry bulb measurements. One method is to use a resistive humidity sensor, such as the DHT11 sensor. The DHT11 sensor calculates relative humidity by measuring the electrical resistance between two electrodes. The humidity sensing component of the DHT11 is a moisture holding substrate with the electrodes applied to the surface. When water vapor is absorbed by the substrate, ions are released by the substrate which increases the conductivity between the electrodes. The change in resistance between the two electrodes is proportional to the relative humidity. Higher relative humidity decreases the resistance between the electrodes while lower relative humidity increases the resistance between the electrodes. This sensor is relatively inexpensive and responsive. However, it has a limited operating range, usually below 70° C. As such, it fails to measure data across the full range of relevant temperatures for humidity measurement in the context of an oven used for baking or roasting, and is not designed to withstand the high temperatures of this environment.

Another known method to measure wet bulb temperature is to use a partial pressure gas sensor. Partial pressure gas sensors measure the pressure of a single gas within a mixture of gasses. Given a set of assumptions about the gas mix in air and atmospheric pressure, one can compute an estimated relative humidity from a partial pressure gas sensor. A common version of a partial pressure gas sensor uses a zirconium oxide probe, which must be heated to 650° C. to establish the necessary physical state to measure the partial pressure of oxygen in the air. Although these sensors can be capable of withstanding the desired temperature range within a cooking oven environment, they are expensive and require additional power consumption and heat-up time to perform the measurement.

Another common solution to determine wet bulb temperature is to use a capacitive measurement as a proxy for humidity content. A capacitive humidity sensor comprises a thin strip of metal oxide between two electrodes. The metal oxide's electrical capacity changes with the atmosphere's relative humidity, thus enabling measurement of the relative humidity. Such sensors are linear and can measure relative humidity from 0% to 100%. However, such sensors also require a relatively complex circuit and regular calibration. Thus, while such devices are commonly used in the weather industry and commercial industries, the need for periodic calibration and the general unavailability of sensors that can withstand the full range of oven temperatures makes this a less desirable option.

The foregoing approaches all sense or calculate relative humidity, which can then be used to compute wet bulb temperature. However, unaccounted changes in atmospheric pressure or imprecise sensing of dry bulb temperature will introduce error into this chain of calculation.

As a consequence of such difficulties, "steam oven" or "combi-oven" products often require the use of a non-ideal system to determine wet bulb temperature. It has also been found that some steam oven products avoid this problem entirely by simply omitting any kind of wet bulb temperature measurement system. Such devices can be expected to have relatively imprecise control of the temperature and relative humidity, leading to less satisfying cooking results.

This description of the background is provided to assist with an understanding of the following explanations of exemplary embodiments, and is not an admission that any or all of this background information is necessarily prior art.

SUMMARY

In a first exemplary embodiment, there is provided a cooking oven wet bulb sensor system having: a reservoir configured to be secured to a cooking chamber wall of the cooking oven, with a cavity of the reservoir in an upward-facing orientation; a temperature sensor probe configured to be mounted at least partially within the cavity of the reservoir; and a water fill opening positioned to dispense water into the cavity.

In some examples, the water fill opening is located outside and above the cavity.

In some examples, the temperature sensor probe extends through a wall defining a portion of the reservoir, and an entire portion of the temperature sensor probe extending through the wall is positioned within the cavity.

In some examples, the cooking oven wet bulb sensor system has a mounting plate secured to the cooking chamber wall, wherein the reservoir is attached to the mounting plate.

In some examples, the mounting plate comprises a temperature sensor probe opening configured to receive the temperature sensor probe with at least a portion of the temperature sensor probe in the cavity.

In some examples, the temperature sensor probe opening extends through a wall defining a portion of the reservoir, and an entire portion of the temperature sensor probe extending through the temperature sensor probe opening is positioned within the cavity.

In some examples, the temperature sensor probe is fixed to the cooking chamber wall, the mounting plate and reservoir are removably connected to the cooking chamber wall, and the cooking oven wet bulb sensor system further comprises a seal configured to seal between the temperature sensor probe and the temperature sensor probe opening when the mounting plate is connected to the cooking chamber wall.

In some examples, the mounting plate is removably secured to the cooking chamber wall, and comprises: a water fill passage configured to allow fluid communication between the water fill opening and the reservoir; and a temperature sensor probe opening configured to receive the temperature sensor probe with at least a portion of the temperature sensor probe in the cavity.

In some examples, the temperature sensor probe is fixed to the cooking chamber wall independently of the mounting plate and reservoir.

In some examples, the water fill opening extends through the water fill passage when the mounting plate is secured to the cooking chamber wall.

In some examples, the mounting plate comprises a water fill passage configured to allow fluid communication between the water fill opening and the reservoir.

In a another exemplary embodiment, there is provided a cooking oven having: a cooking chamber at least partially defined by a cooking chamber wall; a reservoir secured to the cooking chamber wall, with a cavity of the reservoir in an upward-facing orientation; a temperature sensor probe mounted at least partially within the cavity; a water fill opening positioned to dispense water into the cavity; a water supply; and a passage connecting the water supply to the water fill opening.

In some examples, the oven also has at least one of a pump and a valve positioned along the passage and configured to selectively control a flow of water from the water supply to the water fill opening.

In some examples, the oven also has at least one of a pump and a valve positioned along the passage and configured to selectively control a flow of water from the water supply to the water fill opening; and a controller configured to selectively operate the at least one of the pump and the valve to control the flow of water from the water supply to the water fill opening.

In some examples, the oven also has at least one of a pump and a valve positioned along the passage and configured to selectively control a flow of water from the water supply to the water fill opening; and a controller comprising a processor and a memory storing non-volatile instructions that, when executed by the processor, cause the at least one of the pump and the valve to operate to control the flow of water from the water supply to the water fill opening.

In some examples, the oven also has a mounting plate, wherein the reservoir is attached to the mounting plate and the mounting plate and reservoir are removably attached to the cooking chamber wall.

In some examples, the mounting plate comprises at least one of: a water fill passage configured to allow fluid communication between the water fill opening and the reservoir; and a temperature sensor probe opening configured to receive the temperature sensor probe with at least a portion of the temperature sensor probe in the cavity.

In another exemplary embodiment, there is provided a method for operating a cooking oven. The method includes: dispensing a first quantity of water into a cavity located within a cooking chamber, to contact the first quantity of water with a temperature sensor probe located at least partially within the cavity; monitoring an output of the temperature sensor probe; determining whether the first quantity of water has reduced to a predetermined level; and, upon determining that the first quantity of water has reduced to the predetermined level, dispensing a second quantity of water into the cavity to contact the second quantity of water with the temperature sensor probe.

In some examples, determining whether the first quantity of water has reduced to the predetermined level comprises: determining that the output of the temperature sensor probe corresponds to a temperature greater than a boiling point of water within the cooking chamber.

In some examples, determining whether the output of the temperature sensor probe corresponds to a temperature greater than a boiling point of water within the cooking chamber comprises at least one of: evaluating a dry bulb temperature of air within the cooking chamber, and evaluating a local atmospheric air pressure.

BRIEF DESCRIPTION OF THE DRAWINGS

Exemplary embodiments of the invention are described with reference to the accompanying drawings, in which like reference numbers are used to illustrate like parts.

DETAILED DESCRIPTION OF EXEMPLARY EMBODIMENTS OF THE INVENTION

This invention presents novel solutions to the problem of directly sensing wet bulb temperature in a culinary oven and its application for computing relative humidity and managing the temperature of the cooking environment.

Figure 1:
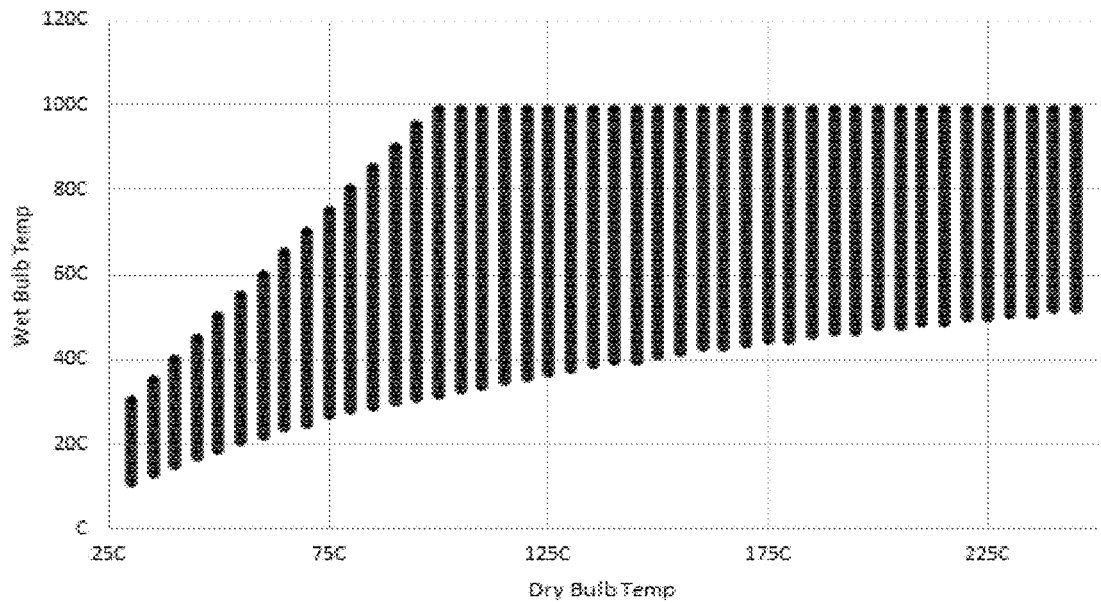
FIG. 1 is a chart of theoretically achievable wet bulb temperatures across a dry bulb range of 30° C. to 250° C. at sea level.
Figure 2:
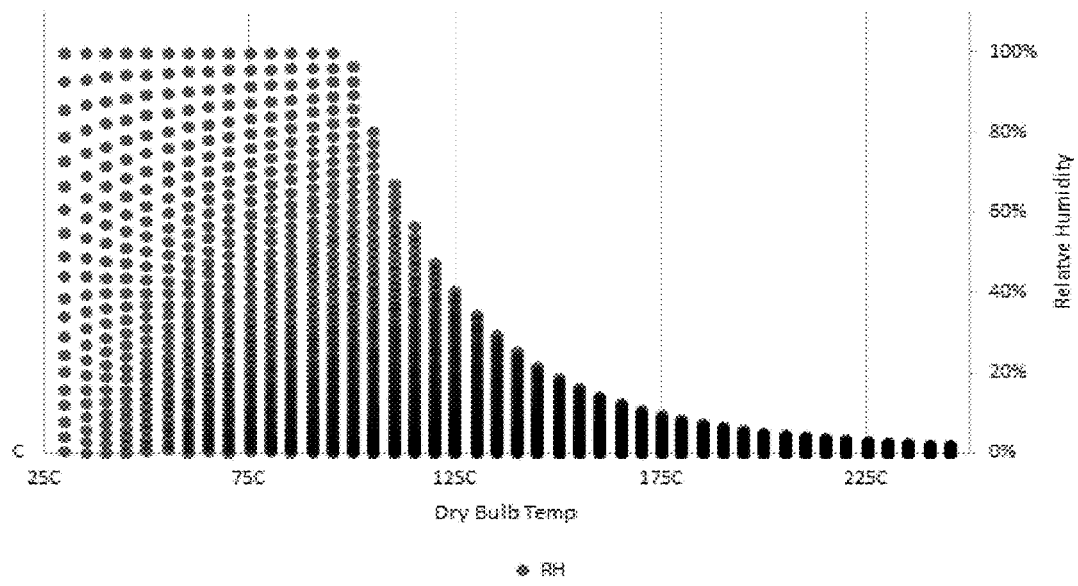
FIG. 2 is a chart of theoretically achievable relative humidity values across a dry bulb range of 30° C. to 250° C. at sea level.
Figure 3:
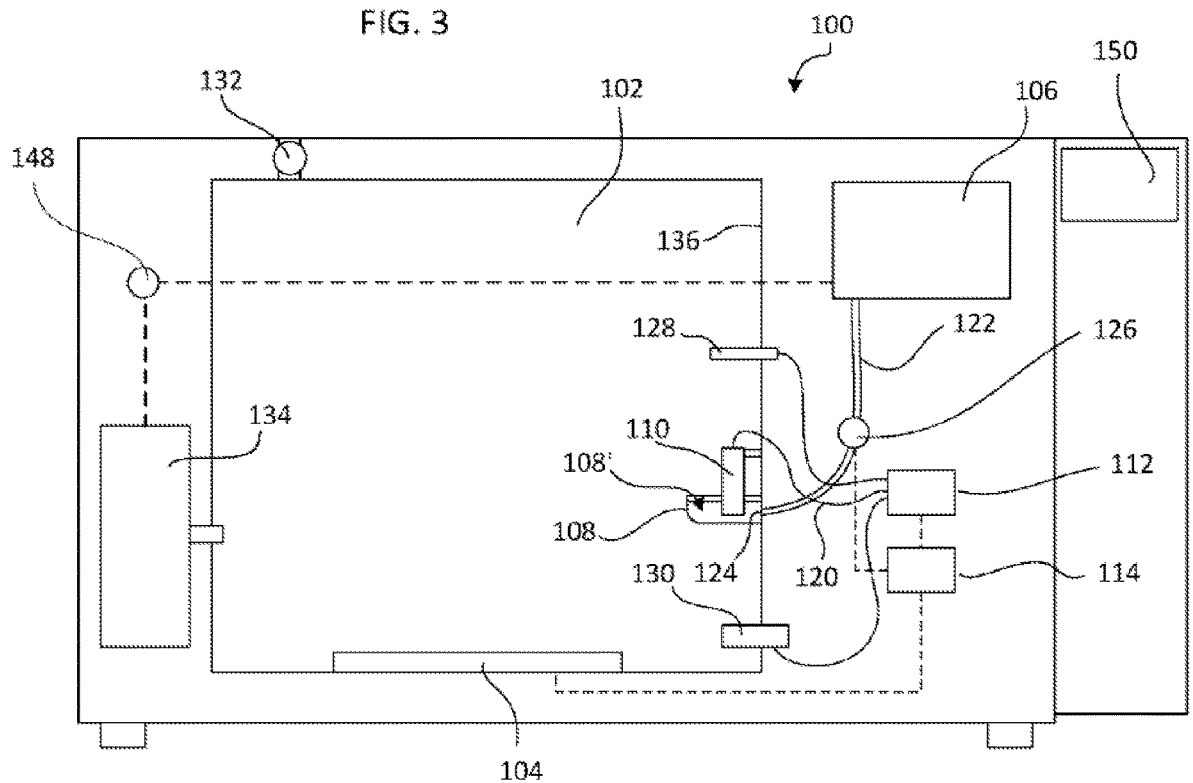
FIG. 3 is a schematic illustration of an exemplary embodiment of an oven having a wet bulb sensor system.
Figure 4:
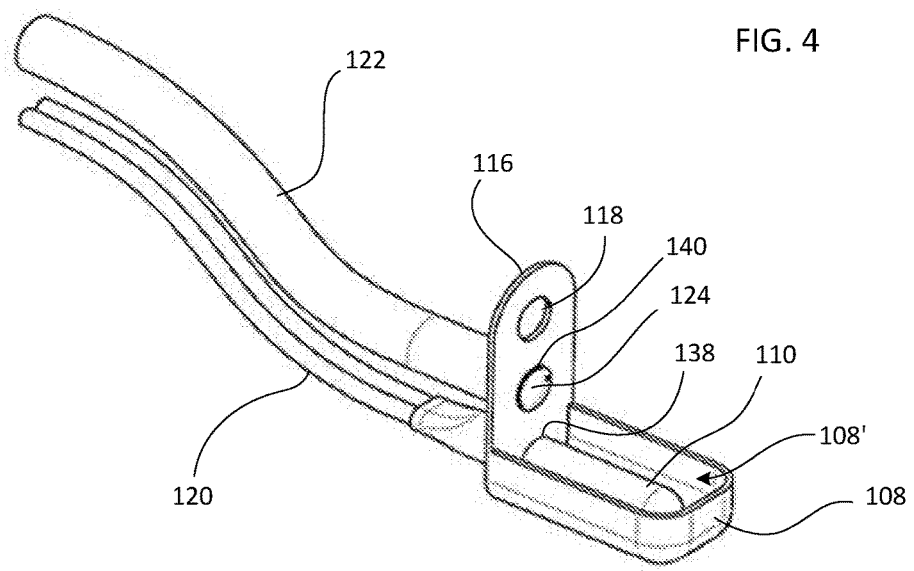
FIG. 4 illustrates another exemplary wet bulb sensor system.

Referring now to FIGS. 3 and 4, in one exemplary embodiment, the invention comprises an oven 100 having a cooking chamber 102, and one or more heating elements 104. The cooking chamber 102 is defined by a cooking chamber wall 136. The cooking chamber 102 is openable to allow a user to place food items into the cooking chamber 102. For example, the cooking chamber 102 may be selectively closed by a door, or it may be formed as a sliding drawer or the like, as known in the art.

The oven 100 includes a wet bulb sensor system that is used to determine the wet bulb temperature within the cooking chamber 102. The wet bulb sensor system generally includes a reservoir 108 that defines an upward-facing cavity 108', a temperature sensing probe 110 located in or extending into the reservoir 108, and a water fill opening 124 that is positioned to dispense water into the cavity 108'.

The upward-facing cavity 108' faces upwards so that it can receive and hold water against the influence of gravity when the oven 100 is positioned for cooking operation. Thus, the term "upwards-facing" refers to the orientation when the oven 100 is set up for cooking, and the cavity 108' is the volume of space defined by the reservoir 108 in which water can be held by gravity.

The reservoir's cavity 108' may be filled at least partially with water during operation of the oven 100. The water in the reservoir 108 is exposed to the same environmental conditions that food experiences inside the oven cavity 102, including dry bulb temperature, airflow, heat flux, and humidity. The reservoir size may vary depending on the specific embodiment and application. For example, the reservoir 108 in a countertop steam oven 100 may have a volume of approximately 2.5 ml. Larger reservoir sizes increase the time of water evaporation, but at the cost of responsiveness.

The composition of the reservoir may also vary by embodiment. It is advantageous for the reservoir material to have high thermal conductivity, low thermal mass, and for it to readily absorb heat by conduction and radiation from the oven air and heating elements. The high thermal conductivity and low mass attributes ensure that the measurement is as responsive as possible. An exemplary material for the reservoir 108 is thin aluminum, but other metals or heat-conductive materials may be used. All materials should tolerate the maximum sustained temperature conditions for their application—in this example of a steam oven for food preparation, the components should tolerate exposure to temperatures up to 250° C. for a period of at least 8 hours of continuous operation. Other embodiments may produce different requirements.

The probe 110 is positioned to measure the temperature of the water in the reservoir 108, as the water responds to the conditions of the oven environment. The probe 110 may be mounted adjacent to the reservoir 108 and configured to extend into the cavity 108', such as shown in FIG. 3, or it may be entirely contained within the cavity 108', such as shown in FIG. 4. The configuration of FIG. 4 is preferred, because the water level can be selected to entirely cover the probe 110 or the probe's active sensing element (e.g., thermocouple), but this is not strictly required in all cases so long as the wetting is sufficient to cause the probe 110 to obtain the desired water temperature reading.

In the example of FIG. 4, the probe 110 has a cylindrical shape with a rounded tip, and the reservoir 108 comprises an upward-facing cavity 108' that is spaced from the probe 110, but surrounds the probe 110 as viewed from the bottom and sides. Thus, the cavity 108' can be filled with water to completely surround the probe 110 with the water. Other embodiments, not detailed here, may position a probe 110 at other locations. For example the probe 110 may be placed just above the reservoir 108 to measure the temperature or heat flux of the column of evaporating water rising from the water surface. As another example, the probe 110 may be positioned where it contacts the wall of the reservoir 108, or it may be contained within a wall of the reservoir 108, such as by securing a thermocouple into a hole that extends along the wall of the reservoir 108. In some embodiments, the probe 110 is placed at the bottom of the reservoir 108, such that it remains in contact with water for as long as possible until the water has fully evaporated. In other embodiments, the probe 110 may be placed at the surface of the water or in between the water surface and the reservoir bottom. The probe 110 also may be movable within the cavity 108' such that it can float on top of the water, thus always remaining in contact with the water surface. Other alternatives and variations will be apparent to persons of ordinary skill in the art in view of the present disclosure.

The temperature sensor probe 110 is configured to generate a signal (either actively, or by passive polling of the sensor state) indicative of temperature. The probe 110 may include one of many known temperature sensing devices, including but not limited to an NTC thermistor, a thermocouple, a resistive temperature measuring device, an infrared sensor, a thermometer, or any other temperature sensing device. The temperature sensing device may be exposed, or it may be sheathed in an outer protective cover that forms a rigid structure of the probe 110, such as the shown metal cylindrical outer sheath. The probe's signal is sampled by, for example, an analog-to-digital converter 112 and a microcontroller 114. Using known parameters, the microcontroller 114 converts the probe's signal into a temperature reading, as known in the art.

The probe 110 and reservoir 108 may be provided in any suitable configuration of parts. In the shown example, the reservoir 108 includes a mounting plate 116 having a hole 118 to receive a fastener (rivet, screw, etc.) for attaching the reservoir 108 to the cooking chamber wall 136. Alternatively, the mounting plate 116 may be attached to the cooking chamber wall 136 by spot welding, inserting it into a slot, or other fastening arrangements. The mounting plate 116 and reservoir 108 preferably are removably attached to the cooking chamber wall 136, but this is not strictly required.

The probe 110 is extends into the cavity 108' through a corresponding probe opening 138 in the mounting plate 116. While not strictly required, the probe opening 138 extends through a wall defining a portion of the reservoir 108, and the entire portion of the temperature sensor probe 110 extending through the temperature sensor probe opening 138 is positioned within the cavity 108' and can be entirely submersed in water. The probe opening 138 is sealed, if necessary, to prevent water leaking through the hole.

The probe 110 is secured to the cooking chamber wall 136 independently from the mounting plate 116 and reservoir 108. For example, the probe 110 may be secured to the cooking chamber wall 136 by a threaded fastener or by a friction fitment into a hole passing through the cooking chamber wall 136. In this configuration, the probe 110 and reservoir 108 may be conveniently mounted to the inner wall of the cooking chamber 102, with the probe wiring 120 being outside the cooking chamber 102 to prevent unnecessary exposure of the wiring 120 to the cooking temperatures.

As noted above, the wet bulb sensor system also include a water fill opening 124 that is positioned to dispense water into the reservoir 108. The water fill opening 124 may be located within the cavity 108', such as shown in FIG. 3, or it may be located outside and above the cavity 108', such as shown in FIG. 4. The water fill opening 124 also may be placed in other locations, provided there is a fluid path to convey water from the water fill opening 124 to the reservoir 108. In the embodiment of FIG. 4, the mounting plate 116 includes a water fill passage 140 that is configured to allow fluid communication between the water fill opening 124 and the reservoir 108. For example, the water fill opening 124 may comprises an opening the is flush with the cooking chamber wall 136, and the water fill passage 140 may comprise a circular hole that overlies an opening when the mounting plate 116 is attached to the cooking chamber wall 136.

The probe 110 and reservoir 108 may be installed on any vertical portion of the cooking chamber wall 136, such as shown in FIG. 3. However, in other cases, the probe 110 and reservoir 108 may be located on a lower horizontal portion of the cooking chamber wall 136 (e.g., by forming the reservoir 108 as a depression in the lower portion), or they may be suspended form an upper horizontal portion of the cooking chamber wall 136. The probe 110 and reservoir 108 also may be attached to different portions of the cooking chamber wall 136. For example, the reservoir 108 may extend laterally from a vertical side of the cooking chamber wall 136, and the probe 110 may extend downward from an upper horizontal portion of the cooking chamber wall 136 to extend into the reservoir 108. Other alternatives and variations will be apparent to persons of ordinary skill in the art in view of the present disclosure.

The probe 110 and reservoir 108 optionally may be thermally insulated from the cooking chamber wall 136 to ensure that heat exchange between the wet bulb sensor and the walls of the oven does not interfere with the accurate reading of wet bulb temperature. For example, a layer of insulating material (not shown) may be interposed between the mounting plate 116 and the cavity wall. Similarly, the fastener (e.g., a screw) holding the mounting plate 116 to the cavity wall may be insulated to inhibit heat conduction from the wall to the reservoir 108.

Figure 5:
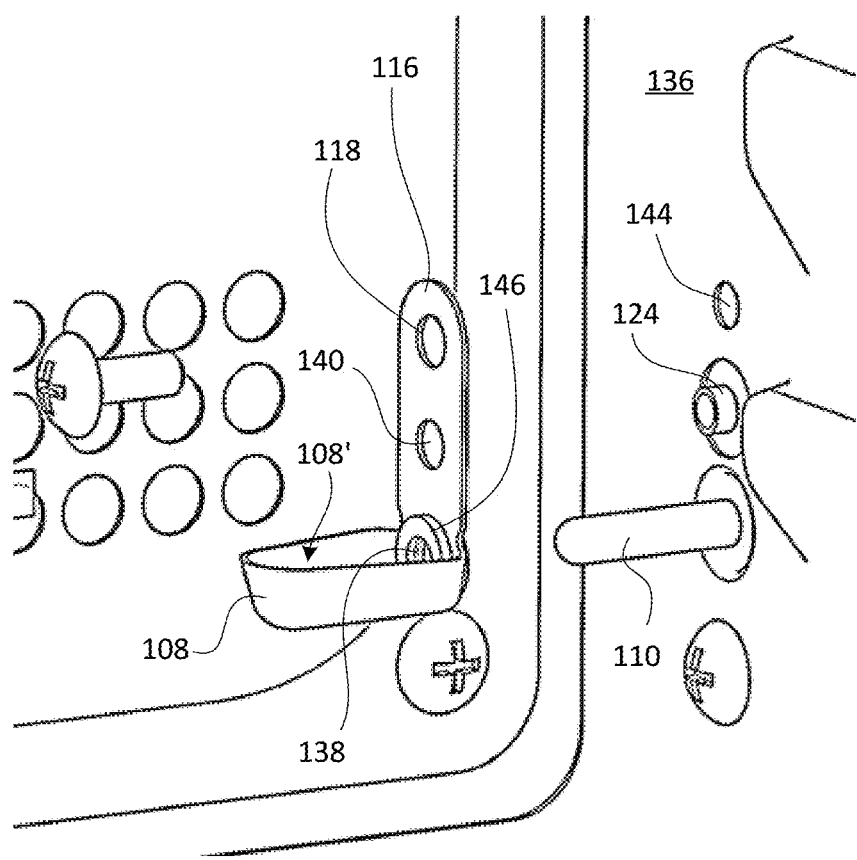
FIG. 5 illustrates another exemplary wet bulb sensor system in a state of partial disassembly.

FIG. 5 shows another example of a cooking oven wet bulb sensor system having a reservoir 108, temperature sensor probe 110, and water fill opening 124. The reservoir 108 is secured to a mounting plate 116, which has a fastener hole 118, a probe opening 138, and a water fill passage 140. The fastener hole 118 is configured to receive, for example, a screw 142 that passes through the fastener hole 118 and threads into a corresponding hole 144 in the cooking chamber wall 136. The water fill opening 124 comprises a short tube that protrudes from the cooking chamber wall 136 far enough to pass through the water fill passage 140. The probe opening 138 includes a grommet 146 that seals against the temperature probe sensor 110 when the mounting plate 116 and reservoir 108 are secured to the cooking chamber wall 136. This arrangement provides a simple and fast assembly and disassembly process, which may be helpful during initial assembly of the oven and during subsequent service and cleaning of the reservoir 108.

The embodiment of FIG. 5 may be modified in various ways. For example, the grommet 146 may be replaced by a face seal that is mounted to the cooking chamber wall 136, or an O-ring that is mounted to the probe 110. As another example, the water fill opening 124 and water fill passage 140 may be located within the cavity 108' of the reservoir 108. Other alternatives and variations will be apparent to persons of ordinary skill in the art in view of the present disclosure.

Referring back to FIG. 3, the exemplary oven 100 also includes a water supply 106 and a passage 122 connecting the water supply to the water fill opening 124. The passage 122 may comprise one or more flexible or rigid tubes or other fluid conduits. The passage 122 provides an open or selectively openable fluid conduit from the water supply 106 to the reservoir 108. For example, the passage 122 may comprise a flexible tube that extends from the water supply 106 to the mounting plate 116, where the tube 122 terminates at a water fill opening 124 located above the reservoir 108. The water supply 106 may comprise a removable tank that is selectively attached to the remainder of the oven 100, or a tank that is permanently attached to the oven 100. In other embodiments, the water supply 106 may comprise a source of pressurized water, such as a household water supply, or any other arrangement for providing a supply of water.

Water is conveyed from the water supply 106 to the reservoir 108 via gravity and/or water pressure. In the shown example, the water supply 106 is located above the reservoir 108, and a flow controller 126 is provided to control the fill level of the reservoir. The flow controller 126 may be a valve, a pump, or any other suitable mechanism, and the flow controller 126 may be manually operated by the user (e.g., before or during the cooking process), or automatically controlled by the microcontroller 114. In the shown example, the flow controller 126 is a valve, such as a gate valve, butterfly valve, ball valve, or the like. When the valve is opened, water flows by gravity from the water supply 106 to the reservoir 108. A valve is expected to be suitable in most cases when the water supply 106 is located above the reservoir 108, in which case gravity can be used as a motive force to drive the water from the water supply 106 to the reservoir 108. In other cases, such as when the water supply 106 is at least partially below the reservoir 108 or more active control of the water flow is desired, the flow controller 126 may comprise a pump, or a combination of a pump and a valve.

The flow controller 126 may be operated by any suitable drive mechanism, such as a solenoid, electric motor, user-operable pushbutton, or the like. When automated control is desired, the flow controller 126 may be controlled by a suitable electric circuit, which may be operated by a control system such as a microcontroller 114. The microcontroller 114 may include, for example, an ALU (arithmetic logic unit), PC (program counter), SP (stack pointer), registers, read-only memory (ROM), random access memory (RAM), parallel I/O ports, serial I/O ports, counters, and a clock circuit. Instructions are stored in a non-volatile manner in the memory, and the instructions can be executed to generate output signals to control the flow controller 126. The microcontroller 114 also may be operatively connected to the heating element(s) 104, a steam generator 134, a steam generator flow controller 148, a user interface 150, and so on.

In use, the flow controller 126 is operated to fill the reservoir 108 with water from the water supply 106, which may be done before the cooking process begins, and at various times during cooking. During cooking, the reservoir 108 experiences the temperatures of the cooking environment, causing the water in the reservoir 108 to evaporate. The rate of evaporation is determined by the amount of energy received by the water in the reservoir 108 from the cooking environment, the dry bulb temperature of the cooking environment, the relative humidity of the cooking environment, the atmospheric pressure, and the rate of airflow over the surface of the water.

As water evaporates from the reservoir 108, the latent heat carried away by the evaporate causes the reservoir 108 to cool slightly. The reservoir temperature is sensed directly by the probe 110. This provides a direct measurement of the wet bulb temperature experienced by any wet foods in the cooking environment.

In some cases, the cook duration may be long enough that the water in the reservoir 108 will evaporate until the water level in the reservoir 108 drops below a threshold value at which the temperature sensor probe 110 becomes unable to provide the desired wet bulb temperature measurement. This threshold water level may be, as various examples: a point at which the temperature sensor probe 110 loses a certain desired degree of precision; a point at which the temperature sensor probe 110 becomes inoperable to measure wet bulb temperature; or a point at which the temperature sensor probe 110 is no longer in contact with the water. When this happens, the oven 100 may be programmed to cease use of the temperature sensor probe 110. More preferably, however, the oven 100 is programmed to refill the reservoir 108 to a water level that provides the desired wet bulb temperature measurement capability.

The reservoir 108 may be refilled using any suitable control algorithm. For example, the flow controller 126 may be activated according to a schedule that is selected based on estimations of when the water level in the reservoir 108 drops below the threshold value. The schedule may a simple fixed schedule (e.g., once every 30 minutes, regardless of the cooking program or other measured variables), or it may be determined based on details of the cooking program and/or measured variables (e.g., once every 30 minutes when the selected cooking temperature or measured dry bulb temperature is below 175° C., and once every 20 minutes when the selected cooking temperature or measured dry bulb temperature is at or above 175° C.). Suitable values for refill time periods can be determined using empirical testing, mathematical estimations, or by other means known in the art. Where multiple different schedules are used, they can be stored in lookup tables or the like for ready access by the microcontroller 114 to operate the oven 100.

The amount of water transferred from the water supply 106 to the reservoir 108 can be controlled by opening a valve-type flow controller 126 or by operating a pump-type flow controller 126 for a predetermined time that might be calibrated to ensure a proper fill volume. In other cases, gated valves or a valve having a fixed flow-through volume (e.g., a ball valve with a fixed volume capacity within the ball) can be used to dispense a relatively precise volume of water per valve actuation. Similarly, fixed volume pumps and peristaltic pumps can be used to provide precise water metering.

In the foregoing cases (or in other cases), a feedback control system may not be used to operate the flow controller 126. This lack of feedback might lead to periods in which the temperature sensor probe 110 is operating relatively ineffectively due to a lack of water (e.g., if the water evaporates more quickly than expected), as well as occasional overfilling of the reservoir 108 (e.g., if the water evaporates more slowly than expected, and the reservoir 108 cannot hold the entire volume of incoming refill water). While such situations might reduce the efficiency or precision of the oven 100, they are not necessarily problematic and some embodiments may be operated in such a way that these situations occasionally, or even regularly, occur.

In other embodiments, a feedback control system may be used to operate the flow controller 126 to fill the reservoir 108 to the desired level. For example, the microcontroller 114 may be coupled with a water level sensor in the reservoir 108 to operate the flow controller 126 only long enough to fill the reservoir 108 to the desired level. Level sensors, such as float switches, electrical capacitance water level sensors, and the like, are known in the art. Other alternatives and variations will be apparent to persons of ordinary skill in the art in view of the present disclosure.

In another embodiment, the temperature sensor probe 110 may be used as a feedback sensor to control the operation of the flow controller 126. As noted above, the maximum possible wet bulb temperature is limited by the lesser of the dry bulb temperature or the boiling point of water. If the temperature read by the probe exceeds the boiling point temperature of water, that means that the water has evaporated out of the reservoir 108 and the reservoir 108 must be replenished. Thus, upon detecting a temperature exceeding the boiling point, the microcontroller 114 may be programmed to operate the flow controller 126 to fully or partially refill the reservoir 108, or it may send a signal to a display indicating that the user needs to refill the reservoir 108. For these purposes, the boiling point of water may be assumed to be a fixed value (e.g., 100° C.), or it may be considered a variable value based on factors such as a dry bulb temperature of air within the cooking chamber, and evaluating a local atmospheric air pressure. The local atmospheric pressure may be detected using a pressure sensor 130, or it may be assumed based on user input as to the location of use, a detected location of the oven 100 based on internet data provided by a wireless communication module, and so on.

Other embodiments may use a variety of different control algorithms, or combinations of control algorithms. For example, waiting until the probe 110 reads a temperature higher than the boiling point can lead to periods in which the wet bulb temperature is not being detected. To avoid this, the microcontroller 114 may be programmed to refill the reservoir 108 when the probe 110 reaches a temperature higher than the boiling point, and also include a routine for fully or partially replenishing the reservoir 108 as determined by an estimated rate of evaporation based on the operating conditions of the oven 100. For example, the microcontroller 114 may be programmed to use lookup tables or use pre-calibrated variables or processing algorithms to determine when to open the valve 126, such as described above. The microcontroller 114 also may be programmed to simply add a certain amount of water at given intervals (possibly with the understanding that some water might spill out of the reservoir 108), to avoid or delay having to purposefully react to reading a temperature above boiling to indicate that the reservoir 108 is empty. Other alternatives and variations will be apparent to persons of ordinary skill in the art in view of the present disclosure.

It will be appreciated from the foregoing that an oven 100 implementing a wet bulb sensor system may be operated according to a variety of routines to ensure that the wet bulb sensor system is active for all or most of the duration of the cooking process. Using any of these methods, an oven 100 may operate to dispense a first quantity of water into the cavity 108' of the reservoir 108, in order to contact the first quantity of water with the temperature sensor probe 110 located at least partially within the cavity 108', and monitor the output of the temperature sensor probe 110 to provide a measure of wet bulb temperature. During operation, the oven 100 can determine whether the first quantity of water has reduced to a predetermined level (e.g., a level at which the wet bulb temperature measurement is compromised. When the first quantity of water has reduced to the predetermined level, the oven 100 can dispense a second quantity of water into the cavity to contact the second quantity of water with the temperature sensor probe 110, and then continue using the temperature sensor probe 110 to measure wet bulb temperature. This process can then be repeated throughout the cooking operation.

The oven 100 can determine that the first quantity of water in the reservoir cavity 108' (or any subsequent quantity of water) has reached the predetermined level using any suitable method. For example, the determination may be based on assumptions about the rate of evaporation, without using any direct measurement of the actual water level. As another example, a the water level may be directly or indirectly measured by a feedback sensor or the like. Any of the examples provided above may be implemented, or other methods may be used to detect the drop in the water level. Other alternatives and variations will be apparent to persons of ordinary skill in the art in view of the present disclosure.

In some embodiments, multiple wet bulb sensor systems may be placed in different locations in the same oven. Their readings may be combined via known methods of aggregation (min, max, average, median, etc.) to improve the accuracy of the readings.

The oven 100 also may contain one or more dry bulb temperature sensing devices 128. These may comprise any of many known temperature sensing devices, including but not limited to an NTC thermistor, a thermocouple, a resistive temperature measuring device, an infrared sensor, a thermometer, or any other temperature sensing device. The readings of multiple temperature sensing devices 128 readings may be combined via known methods of aggregation (min, max, average, median, etc.) to improve the accuracy of the readings.

By using the formulas described above (or comparable algorithms or lookup tables), the microcontroller 114 may calculate the relative humidity, absolute humidity, dew point, and other environmental metrics of interest based on the direct measurements of dry bulb temperature, wet bulb temperature, and partial or total atmospheric pressure.

As noted above, the atmospheric pressure may be is estimated as the normal pressure at sea level, or it may be refined based on the operating altitude of the device as measured directly by GPS sensors, as indicated directly by user input (e.g., via a smartphone user interface or directly into the oven's control input), or using other known methods. In further embodiments, the atmospheric pressure, both inside and outside of the oven cavity may be measured directly using known methods, such as by using a conventional pressure sensor 130.

Using known methods, including but not limited to PID algorithms, so-called "bang-bang" thermostat algorithms, or other methods, the microcontroller 114 can adjust the heating behavior of the oven 100 based on the determined dry bulb temperature and wet bulb temperature. For example, the user may specify a desired wet bulb temperature for the oven to reach and hold for the purpose of cooking food to a specific temperature. In some embodiments, the microcontroller 114 uses the temperature measurement from the wet bulb sensor as an input to its temperature control algorithm that determines the power supplied to one or more heating elements 104 in the oven over time.

In another embodiment of the operating behavior, the user may choose to specify both target dry bulb and wet bulb temperatures that are different from one another. In this scenario, the microcontroller 114 may operate an external vent valve 132 or steam boiler 134 to directly alter the relative humidity in the oven in order to maintain dry bulb and wet bulb targets simultaneously.

In other embodiments, the wet bulb sensor may be used in cooling or heating and cooling operations. For instance, a wet bulb sensor may be used as a method of computing humidity in a refrigerator, wine cellar, smoker, fermentation chamber, or any other environment where control over temperature and humidity is desired.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A cooking oven wet bulb sensor system comprising:
   a cooking chamber including a top wall, a bottom wall, and side walls;
   a reservoir secured to one of the side walls and above the bottom wall, with a cavity of the reservoir being open in an upward-facing orientation to the cooking chamber and configured to hold a quantity of water therein;
   a temperature sensor probe configured to be mounted at least partially within the cavity of the reservoir, with the temperature sensor probe at least partially submerged in the quantity of water to measure a temperature in the reservoir; and
   a water fill opening positioned to dispense water into the cavity.

2. The cooking oven wet bulb sensor system of claim 1, wherein the water fill opening is located outside and above the cavity.

3. The cooking oven wet bulb sensor system of claim 1, wherein the temperature sensor probe extends through one of the side walls defining a portion of the reservoir, and an entire body of the temperature sensor probe extending through the wall is positioned within the cavity of the reservoir.

4. The cooking oven wet bulb sensor system of claim 1, further comprising a mounting plate secured to the cooking chamber wall, wherein the reservoir is attached to the mounting plate.

5. The cooking oven wet bulb sensor system of claim 4, wherein the mounting plate comprises a temperature sensor probe opening configured to receive the temperature sensor probe with at least a portion of the temperature sensor probe in the cavity.

6. The cooking oven wet bulb sensor system of claim 5, wherein the temperature sensor probe opening extends through a wall defining a portion of the reservoir, and an entire body of the temperature sensor probe traversing through the temperature sensor probe opening is positioned within the cavity.

7. The cooking oven wet bulb sensor system of claim 5, wherein:
   the temperature sensor probe is fixed to the cooking chamber wall,
   the mounting plate and reservoir are removably connected to the cooking chamber wall, and
   the cooking oven wet bulb sensor system further comprises a seal configured to seal between the temperature sensor probe and the temperature sensor probe opening when the mounting plate is connected to the cooking chamber wall.

8. The cooking oven wet bulb sensor system of claim 5, wherein the mounting plate is removably secured to the cooking chamber wall, and comprises:
   a water fill passage configured to allow fluid communication between the water fill opening and the reservoir; and
   a temperature sensor probe opening configured to receive the temperature sensor probe with at least a portion of the temperature sensor probe in the cavity.

9. The cooking oven wet bulb sensor system of claim 8, wherein the temperature sensor probe is fixed to the cooking chamber wall independently of the mounting plate and reservoir.

10. The cooking oven wet bulb sensor system of claim 8, wherein the water fill opening extends through the water fill passage when the mounting plate is secured to the cooking chamber wall.

11. The cooking oven wet bulb sensor system of claim 4, wherein the mounting plate comprises a water fill passage configured to allow fluid communication between the water fill opening and the reservoir.

12. The cooking oven wet bulb sensor system of claim 1, wherein the water fill opening is arranged within the cavity.

13. A cooking oven comprising:
a cooking chamber including a top wall, a bottom wall, and side walls;
a reservoir secured to the one of the side walls and above the bottom wall, with a cavity of the reservoir being open in an upward-facing orientation to the cooking chamber and configured to hold a quantity of water therein;
a temperature sensor probe mounted at least partially within the cavity, with the temperature sensor probe partially submerged in the quantity of water to measure a temperature in the reservoir;
a water fill opening positioned to dispense water into the cavity;
a water supply; and
a passage connecting the water supply to the water fill opening.

14. The cooking oven of claim 13, further comprising at least one of a pump and a valve positioned along the passage and configured to selectively control a flow of water from the water supply to the water fill opening.

15. The cooking oven of claim 13, further comprising:
at least one of a pump and a valve positioned along the passage and configured to selectively control a flow of water from the water supply to the water fill opening; and
a controller configured to selectively operate the at least one of the pump and the valve to control the flow of water from the water supply to the water fill opening.

16. The cooking oven of claim 13, further comprising:
at least one of a pump and a valve positioned along the passage and configured to selectively control a flow of water from the water supply to the water fill opening; and
a controller comprising a processor and a memory storing non-volatile instructions that, when executed by the processor, cause the at least one of the pump and the valve to operate to control the flow of water from the water supply to the water fill opening to at least partially submerge the temperature sensor probe.

17. The cooking oven of claim 13, further comprising a mounting plate, wherein the reservoir is attached to the mounting plate and the mounting plate and reservoir are removably attached to the cooking chamber wall.

18. The cooking oven of claim 17, wherein the mounting plate comprises at least one of:
a water fill opening configured to allow fluid communication between the water fill opening and the reservoir; and
a temperature sensor probe opening configured to receive the temperature sensor probe with at least a portion of the temperature sensor probe in the cavity.

19. A method for operating a cooking oven, the method comprising:
dispensing a first quantity of water into a cavity located within a cooking chamber, to contact the first quantity of water with a temperature sensor probe located at least partially within the cavity, and with the temperature sensor probe at least partially submerged in the first quantity of water;
monitoring, by a controller comprising a processor and a memory storing operating instructions in a non-volatile manner, an output of the temperature sensor probe indicating a temperature in the cavity;
determining, by the controller, whether the first quantity of water has reduced to a predetermined level; and,
upon determining that the first quantity of water has reduced to the predetermined level, operating the controller to open a valve to dispense a second quantity of water into the cavity to at least partially submerge the temperature sensor probe in the second quantity of water.

20. The method of claim 19, wherein determining whether the first quantity of water has reduced to the predetermined level comprises:
determining that the output of the temperature sensor probe corresponds to a temperature greater than a boiling point of water within the cooking chamber.

21. The method of claim 20, wherein the determining whether the output of the temperature sensor probe corresponds to a temperature greater than a boiling point of water within the cooking chamber comprises at least one of: evaluating a dry bulb temperature of air within the cooking chamber, and evaluating a local atmospheric air pressure.

* * * * *